Dec. 18, 1923.

J. I. HOLCOMB ET AL 1,477,704

POP CORN MACHINE

Filed Nov. 12, 1920     3 Sheets-Sheet 1

INVENTORS
JAMES I. HOLCOMB
JACOB F. HOKE, JR.

BY

ATTORNEYS

Dec. 18, 1923.

J. I. HOLCOMB ET AL 1,477,704

POP CORN MACHINE

Filed Nov. 12, 1920     3 Sheets-Sheet 3

INVENTORS.
JAMES I. HOLCOMB.
JACOB F. HOKE, JR.
BY
Lockwood Lockwood
ATTORNEYS.

Patented Dec. 18, 1923.

1,477,704

UNITED STATES PATENT OFFICE.

JAMES I. HOLCOMB AND JACOB F. HOKE, JR., OF INDIANAPOLIS, INDIANA, ASSIGNORS TO HOLCOMB & HOKE MFG. CO., OF INDIANAPOLIS, INDIANA.

POP-CORN MACHINE.

Application filed November 12, 1920. Serial No. 423,625.

*To all whom it may concern:*

Be it known that we, JAMES I. HOLCOMB and JACOB F. HOKE, Jr., citizens of the United States, and residents of Indianapolis, county of Marion, and State of Indiana, have invented a certain new and useful Pop-Corn Machine; and we do hereby declare that the following is a full, clear, and exact description thereof, reference being had to the accompanying drawings, in which like numerals refer to like parts.

This invention relates to a pop corn machine and particularly that type of machine adapted for popping and vending pop corn.

One feature of the invention is to so construct the feeding, popping and buttering mechanism of the machine, that it will be small and compact in comparison with other pop corn machines of the type. By constructing the machine in the manner shown and described, it may be readily mounted on counters, show cases or the like, whereby floor space may be saved in eliminating the usual cabinet pedestal. Also the fewer operating parts will decrease the cost of the machine and the initial expense to the vender, and in addition will attract the eye and cause speculation as to its operation.

One of the most important features of the invention lies in the popping receptacle which is enclosed and covered by an inverted bowl of glass or transparent material, whereby the agitation of the corn during its popping may be displayed, and the substantially air tight chamber will cause the corn to be popped with a less expenditure of heat, thereby saving the operating expense to a material degree. This feature of the invention also assures a better grade of popped corn as it causes the corn to become whiter, lighter, fluffier and prevents the burning thereof to a greater extent than the 'open popper.

Another feature of the invention lies in the mechanism for feeding the corn to the popping receptacle and permitting the corn to be discharged therefrom at properly timed intervals.

Another feature of the invention consists in the buttering device for the popped corn, whereby only the popped corn of proper size will be buttered and the unpopped corn and waste is eliminated and discharged without becoming mixed with the butter.

The full nature of this invention will be understood from the accompanying drawings and the following description and claims.

Figure 1:
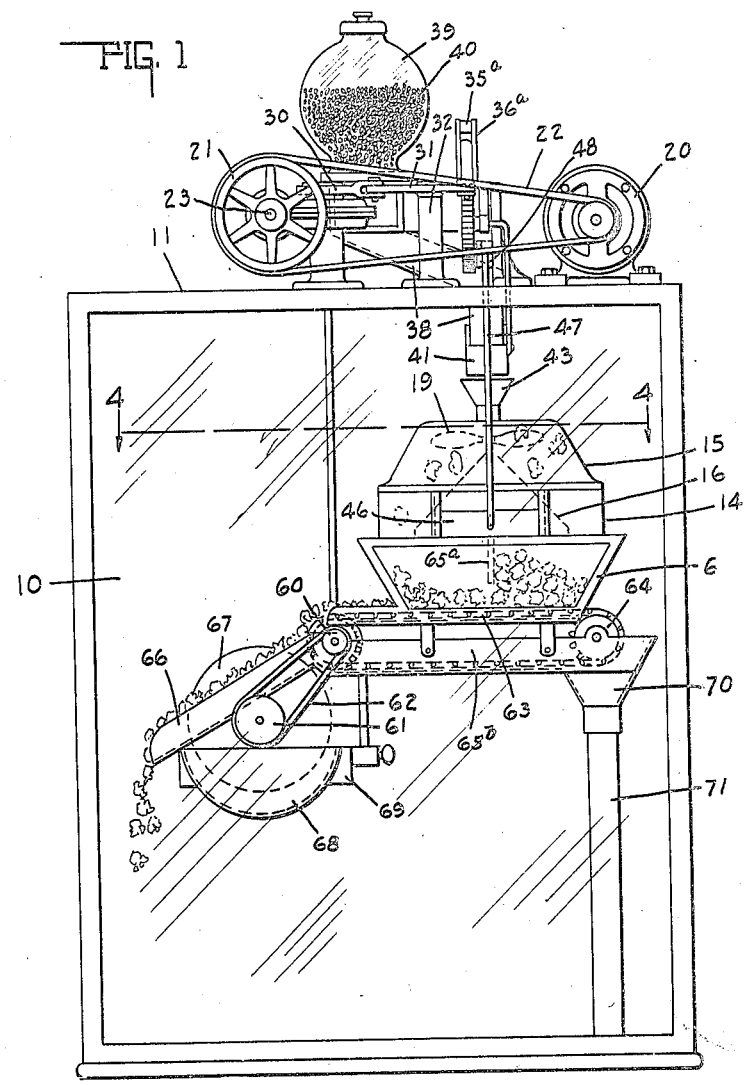
Figure 2:
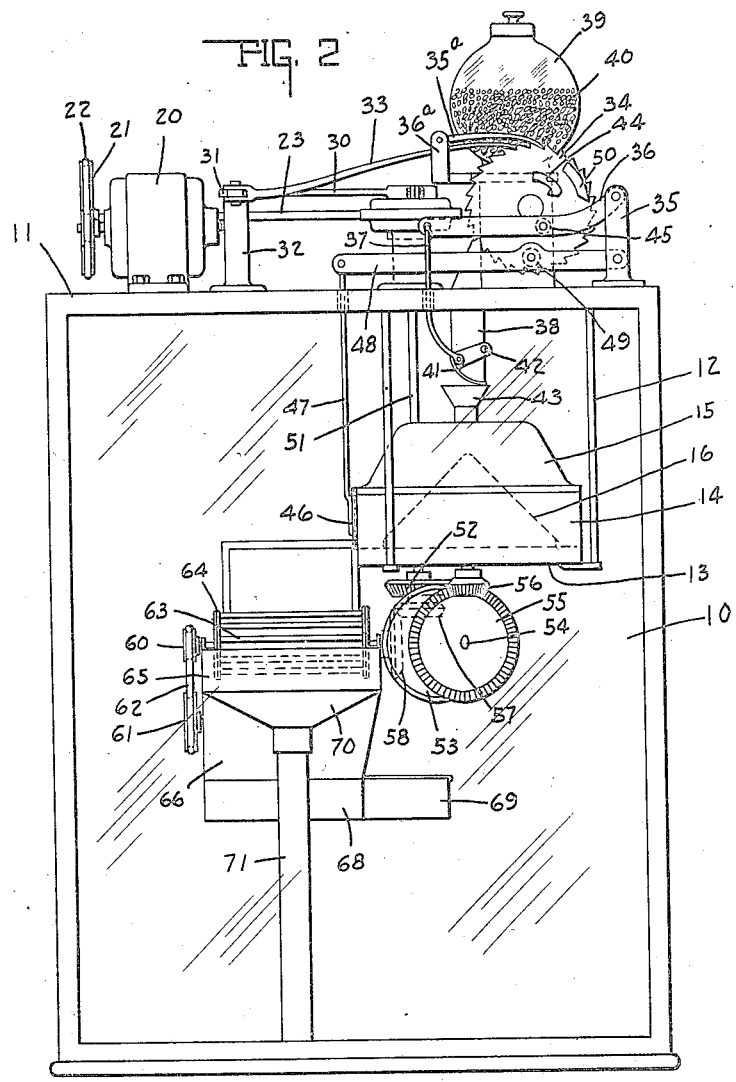
Figure 3:
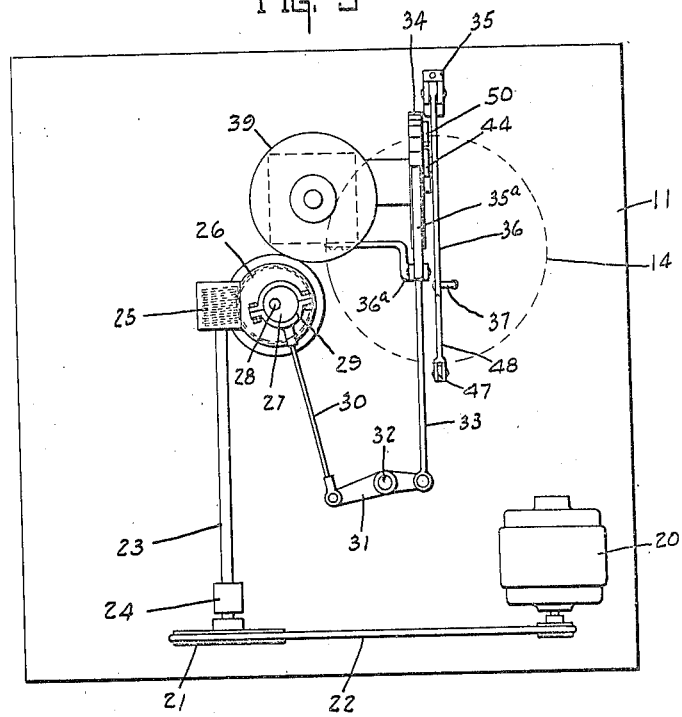
Figure 4:
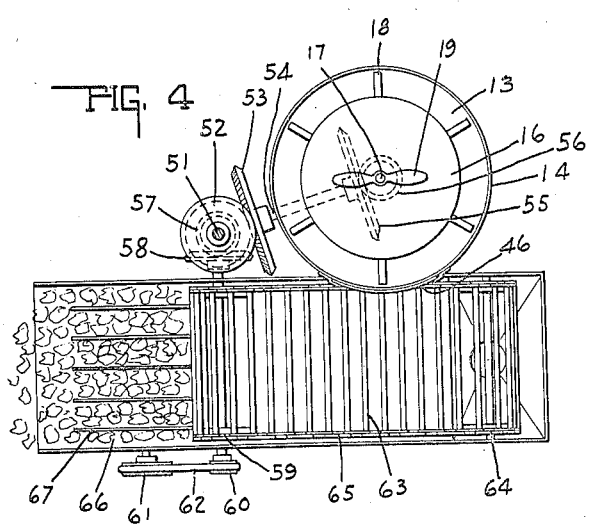

Fig. 1 is a side elevation of the machine. Fig. 2 is a rear elevation. Fig. 3 is a plan view looking down on the top thereof. Fig. 4 is a view taken on the line 4—4 of Fig. 1 with the popped corn eliminated.

In the drawings there is shown a pop corn machine having a glass cabinet 10 provided with a top 11 upon which is mounted the operating mechanism of the machine. The cabinet 10 is substantially rectangular in shape and provided with glass on three sides and a glass door in front. The popping and buttering mechanism of the pop corn machine is mounted within the glass cabinet, substantially as illustrated in Figs. 1 and 2. Supported by the depending rods 12 from the top of the cabinet there is a popping receptacle comprising a hot plate 13 which may be heated from any suitable source, but preferably by an electric heating element mounted therein. Surrounding the hot plate 13 there is an annular metal wall 14 upon which is removably mounted a glass cover 15 formed in the manner of an inverted glass vessel preferably made of glass adapted to withstand the heat, for completely enclosing the popping receptacle. Extending upwardly from adjacent the hot plate into the glass cover there is a conical spreading member 16 supported on a shaft 17 having its apex extending upwardly adjacent the central opening of the cover through which the unpopped corn is fed into the receptacle. The conical spreading member causes the corn to be spread radially when it is fed therein and while it is being popped so that it will not be permitted to gather or pile up in the center of the receptacle and will at all times be thrown adjacent the outer wall thereof. The shaft 17 extends upwardly through the bottom of the hot plate, and carries a plurality of stirring arms 18 which lie adjacent the surface of the hot plate and are adapted to be rotated for agitating the corn and discharging it when the receptacle is open. Mounted on said shaft just above the apex of the conical member there are fan blades 19 which are caused to be revolved by said shaft for fanning the corn disturbing it and causing the hot air rising to the top of the receptacle to be directed downwardly upon the top of the corn.

For operating the mechanism of the popping mechine there is provided an electric motor 20 mounted on the top 11 in position to drive a pulley 21 by means of the belt 22. The pulley 21 is keyed to the shaft 23 supported by the bearing 24 and having a worm 25 on one end thereof. The worm 25 meshes with and drives the worm gear 26, upon which there is an eccentric 27 mounted on the shaft 28 adapted to revolve within a collar 29 mounted on the rod 30, whereby the revolving of the gear 26 will cause the shaft 30 to reciprocate back and forth. The rod 30 is pivoted to a link 31 which is pivotally mounted on the top 11 at 32, and to which the finger 33 is pivoted at its other end. The other end of the finger 33 is arranged to engage the teeth of the ratchet wheel 34, whereby each forward movement of said finger caused by the actuation of the rod 30 will cause said ratchet wheel to be moved forward a slight distance, sufficiently to cause the finger $35^a$, which is pivotally mounted upon the bracket $36^a$, to fall back one tooth and hold said ratchet wheel in position while the reciprocating finger 33 is pulled back to engage a new tooth and push the wheel forward. By means of this arrangement the ratchet wheel 34 is turned slowly one tooth or notch at a time as the finger 33 is reciprocated. This constitutes to some degree the timing of the popping machine, as it controls the introduction of the corn therein and the discharge of the popped corn therefrom.

Mounted on the top 11 of the cabinet there is a standard 35 upon which is pivoted an arm 36 extending adjacent the surface of the ratchet wheel 34 and connected at its opposite end to a rod 37 extending down through the top into the machine for opening and closing the discharge spout 38 of the glass hopper 39. The grains of corn 40 contained in the hopper 39 pass into the discharge spout 38 by gravity and are held therein by the sliding closure 41 mounted on the arms which are pivoted at 42. The rod 37 is pivoted to said arms so that when it is elevated it causes the closure to slide from over the discharge end of said spout so as to permit the grains to pass into the receiving mouth 43 of the popping receptacle. The rod 37 is elevated by the engagement of the cam member 44 with the projection 45 on the arm 36. As the ratchet wheel 34 revolves, the cam 44 will engage the projection 45 and elevate the arm and cause the plate to be opened during the length of time it takes the cam member to pass said projection, after which the arm causes the closure to shut off the supply of corn by gravity. In a like manner, the discharge door 46 on the metal wall 14 of the receptacle is elevated, so as to permit the corn to be discharged therefrom, by the rod 47 which is secured at one end thereto and extends through the top 11 and is pivoted at the other end to the arm 48. The arm 48 is pivoted at its opposite end to the standard 35 immediately below the arm 36 and adjacent the ratchet wheel 34. The arm 48 is provided with a projection 49 adapted to engage the cam member 50 on said ratchet wheel, whereby upon the ratchet wheel carrying the cam member around into engagement with the projection 49 the arm 48 will be elevated so as to cause the discharge door 46 to be raised and permit the discharge of the popped corn. The cam 50 is so arranged, and the wheel so timed, that upon the popped corn being discharged the projection will be released and gravity will cause the arm to descend and the door to close. It will be understood that the cam member 50 slightly precedes the cam member 44 so as to cause the door to open and the popped corn to be discharged therethrough and close after the spout 38 is opened for permitting a new supply of corn to enter the receptacle. The ratchet wheel 34 is so arranged that the corn will be popped and ready to be discharged upon one revolution thereof.

The worm gear 26 is arranged to drive the shaft 51, which extends directly downward into the cabinet 10 and has mounted thereon a beveled gear 52 adapted to mesh with the beveled gear 53. The gear 53 is mounted on the shaft 54, having a beveled gear 55 on the other end thereof in position to mesh with the beveled gear 56 which drives the shaft 17 extending up through the hot plate and conical member for driving the fan 19 and the stirring arms 18. Also mounted on the shaft 51 below the gear 52, there is a gear 57 adapted to mesh with the bevel gear 58 for driving the sprocket wheel 59 and pulley 60. The pulley 60 drives the pulley 61, through the belt 62, for operating the buttering plates, and the sprocket 59 drives the endless carrying belt 63 mounted upon the sprockets 64.

The buttering device consists of a glass vessel 65 mounted adjacent and below the door 46 of the popping receptacle so that when the popped corn is discharged therethrough it will fall into said vessel. The bottom of said vessel consists of an endless carrying belt 63 provided with spaced cross members arranged so that the properly popped corn will be supported thereon and carried, while any unpopped grains, burnt grains and chaff and the like will pass between the cross members and fall to the bottom of the pan $65^b$.

The carrying belt discharges the popped corn into an inclined chute 66 where the corn is buttered by engagement with the buttering disks 67 and the butter covered surface of said chute, the butter being supplied by the passage of the disks 67 through a container 68 which is constantly kept filled with melted butter from the supply chamber 69 into which a cake of butter is placed and melted by means of a heating element, not shown herein, or any other suitable means. After the popped corn has passed between the buttering disks and over the butter covered chute, it falls to the bottom of the cabinet ready for sale. The unpopped corn and chaff which has dropped through the carrying belt over the bottom of the pan 65$^b$ is carried in the opposite direction by the return movement of the belt and pushed along the bottom until it drops in a chute 70 and is discharged through a waste pipe 71 from the cabinet.

Briefly the operation of the machine is as follows. The unpopped corn is placed in the hopper 39 and immediately drops into the spout 38. A cake of butter is placed in the supply chamber 69 and the current turned on. The butter will be melted and fill the chamber 68 and the motor will turn the mechanism so that the ratchet wheel will turn until the cam member 44 elevates the arm 36. The corn will then be allowed to fall into the popping receptacle and spread over the hot plate around the conical member 16. The cam member 44 is so arranged that it will release the arm 36 and the spout 38 will be closed upon the proper amount of corn being discharged. The hot plate will have been heated by the electrical current and the corn will be agitated by the revolving arms 18 and heated until popped, during which time the popping will cause the grains to be agitated in the receptacle so as to cause a display through the glass cover 15. Upon a single rotation of the ratchet wheel 34 the corn will have been in the receptacle a sufficient time to be properly popped, and the cam member 50 will cause the arm 48 to raise the door 46 and the corn, being revolved by the arms 18, will be discharged therethrough, aided by the conical member 16. The cam member 50 will permit the door to be closed after a given interval, during which time all the corn will have been discharged. Immediately the cam 44 will again open the closure 41 and permit a new supply to enter the receptacle, the above operation being repeated. The popped corn falling on the carrying belt 63 will be gradually carried forward and a certain limited amount passed from within the receptacle 65 and discharged down the buttering chute 66. It will slowly move down the chute, due to the butter thereon, during which movement the buttering will be effected by the buttering disks 67. The machine and quantity of corn popped are so timed that upon the corn being carried from the vessel 65, a new supply of popped corn will be discharged from the popping receptacle so that a continuous discharge of popped and buttered corn will flow from the vessel 65, the waste corn and chaff being carried back and discharged through the waste pipe so as not to mix with the properly popped corn.

The invention claimed is:

1. A pop corn machine including a transparent cabinet, a circular corn popping hot plate therein, and a circular heat and corn retaining cover for the hot plate with the upper portion thereof transparent.

2. A pop corn machine including a transparent cabinet, a circular corn popping hot plate therein, a vertical circular wall closely surrounding the hot plate, and a removable transparent upwardly extending cover upon said wall.

3. A pop corn machine including a corn popping hot plate, a corn and heat retaining cover therefor having a tapering transparent top, and a conical member mounted centrally on said hot plate and extending upwardly into the transparent top portion of the cover.

4. A pop corn machine including a corn popping hot plate, a vertical inclosing wall extending about the same, a conical member mounted centrally on said hot plate, a transparent heat and corn retaining cover mounted upon and extending above said conical member, and means for discharging corn directly through the transparent top portion of the cover on to said conical member.

5. A pop corn machine including a corn popping hot plate, a cover therefor having a transparent upper portion formed to permit observation of the corn popping operation and retain the heat from said plate therein, a corn hopper, and a conveyor for conducting the corn from the hopper to the hot plate through said transparent cover, whereby the corn may be fed into said machine without removing the cover therefrom.

6. A pop corn machine including a corn popping hot plate, an enclosing cover therefor having a substantially dome-shaped top for permitting observation of the corn popping operation and maintaining the heat therein, a conical member mounted centrally adjacent said hot plate and extending upwardly into the transparent portion of said cover, a conveyor for conveying corn through said cover on to said member, whereby it will be distributed about the surface of said plate.

7. A pop corn machine including a corn popping hot plate, a cover therefor having a substantially dome-shaped top for permitting observation of the corn popping operation and maintaining the heat therein, a conical member mounted centrally adjacent said hot plate and extending upwardly into the transparent portion of said cover, a corn hopper, a conveyor for conveying corn from said hopper through said cover on to said member for distributing the same, and a horizontally rotatable fan in the transparent portion of the cover and above the central conical member for directing the heated air down on to the corn being popped.

8. A pop corn machine including means for heating the corn for popping the same, a closure mounted in connection with said heating means for retaining the heat and popped corn, said closure having an opening through which the popped corn may be discharged, means for distributing the corn towards the periphery of said heating means, rotary means adapted to revolve about the center thereof for agitating the corn and causing it to be discharged through said opening, and a horizontally-mounted revolving fan above said heating means for directing the heated air in said element downwardly upon the corn being popped.

9. A corn popping machine including a hot plate for transmitting heat to the corn, a transparent closure for said hot plate, an upwardly extending conical distributing member mounted on said hot plate within said closure for distributing the corn about the periphery of said hot plate, revolving arms adjacent the peripheral surface of said hot plate for agitating the corn being popped thereon and discharging it therefrom upon said element being opened, and a revolving fan for directing the heated air downwardly upon said corn.

10. The combination with a pop corn machine having a popping element, of means for introducing a given amount of corn therein and discharging the popped corn therefrom, including a ratchet wheel, cam members on said ratchet wheel, a reciprocating finger for causing said ratchet wheel to turn, means for reciprocating said finger, a spout through which corn is introduced into said element, a door through which said corn is discharged from said element, and an arm for opening and closing said door, said arm being actuated to open said door by one of said cam members, and to close said door by the other cam member, said cam members being so positioned as to time the opening and closing of said door, whereby the popped corn will be discharged from said element upon the completion of the popping thereof and the door will be closed upon the discharge of the corn being completed.

11. The combination with a pop corn machine having a popping element, of means for introducing a given amount of corn therein and discharging the popped corn therefrom, including a ratchet wheel, cam members on said ratchet wheel, a reciprocating finger for causing said ratchet wheel to turn, means for reciprocating said finger, a spout through which corn is introduced into said element, means for controlling the discharge of corn therethrough, an arm for operating said discharge means engaged and operated by one of said cam members, a door through which said corn is discharged, an arm for opening and closing said door, said arm being engaged by the other cam member and elevated to open said door, and said cam members being so disposed as to cause said arms to open and close said spout and door at timed intervals, whereby the corn will be introduced through said spout upon the discharge of the popped corn and the popped corn will be discharged from said element upon the completion of the popping thereof.

In witness whereof, we have hereunto affixed our signatures.

JAMES I. HOLCOMB.
JACOB F. HOKE, Jr.